UNITED STATES PATENT OFFICE.

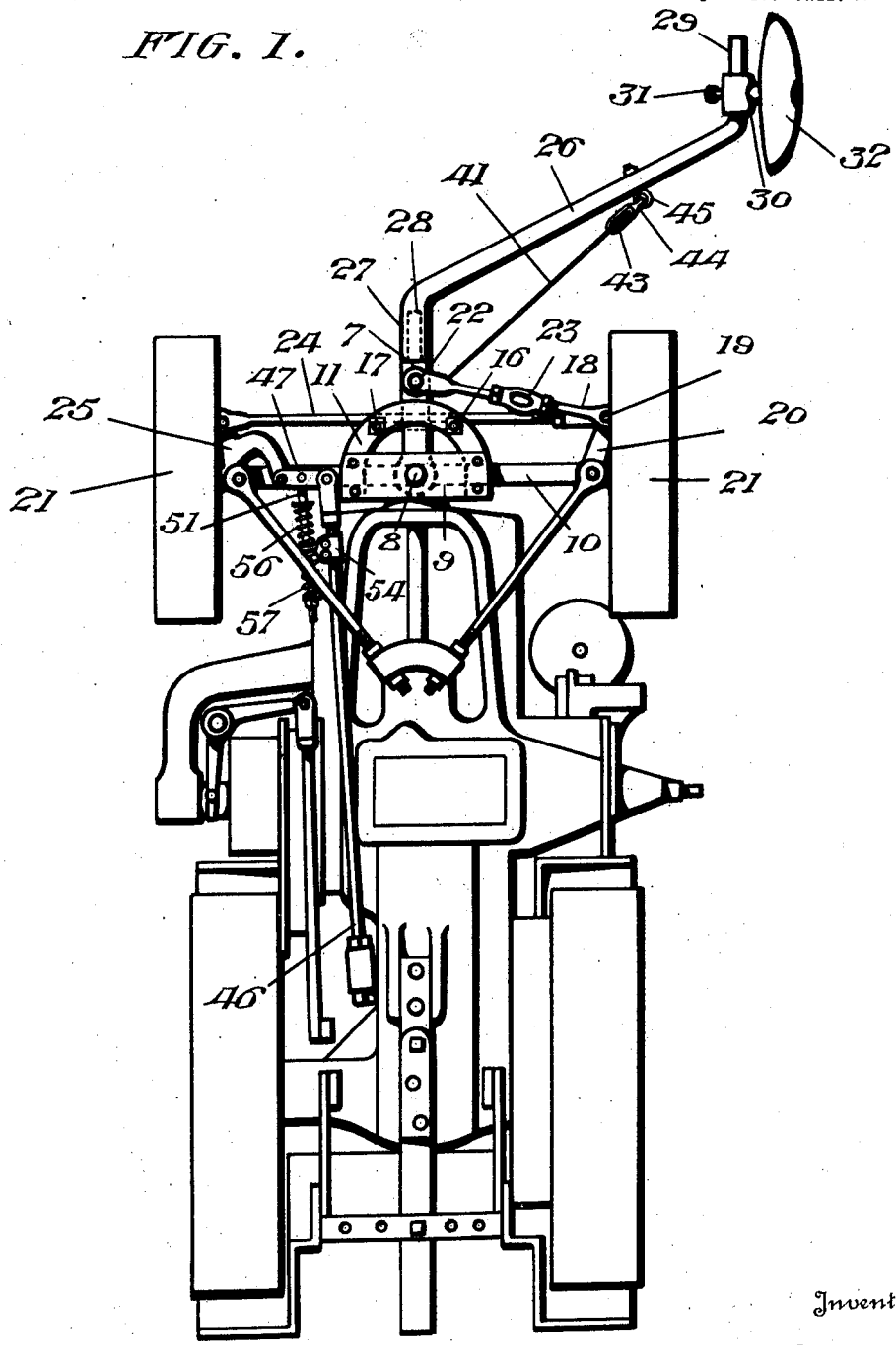

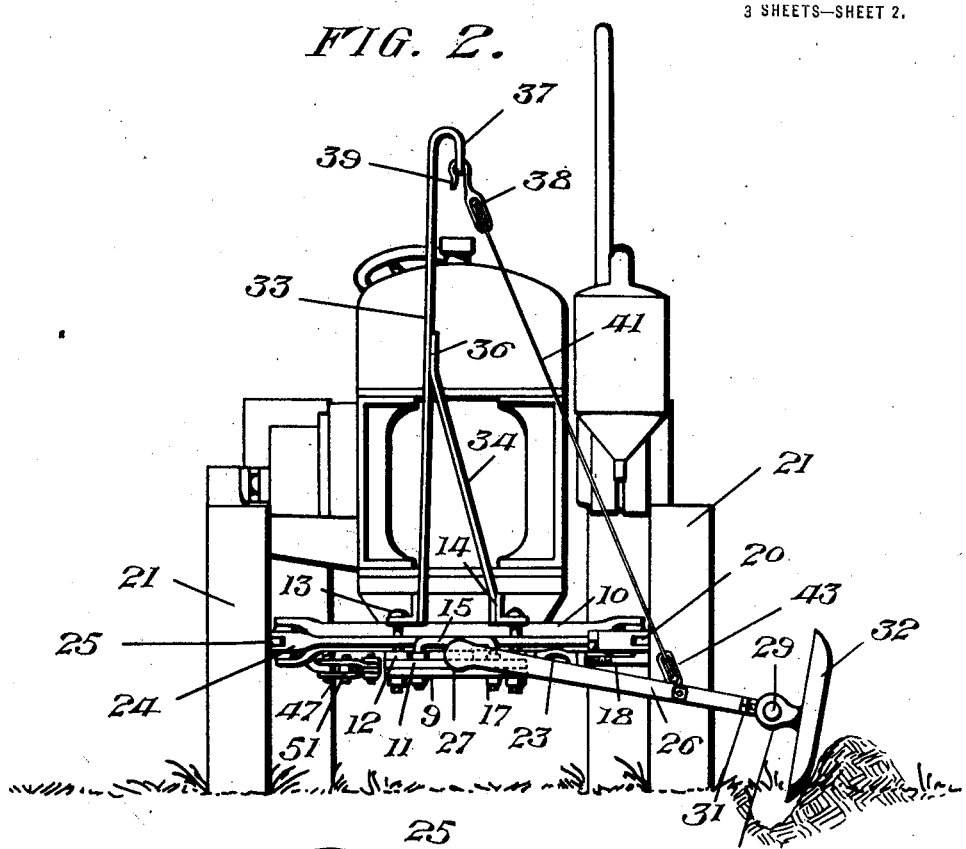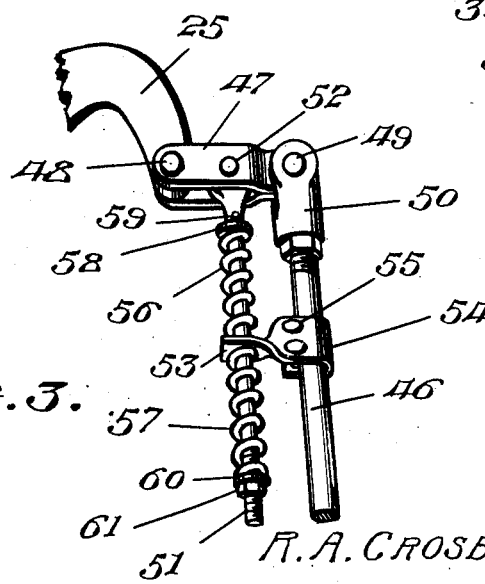

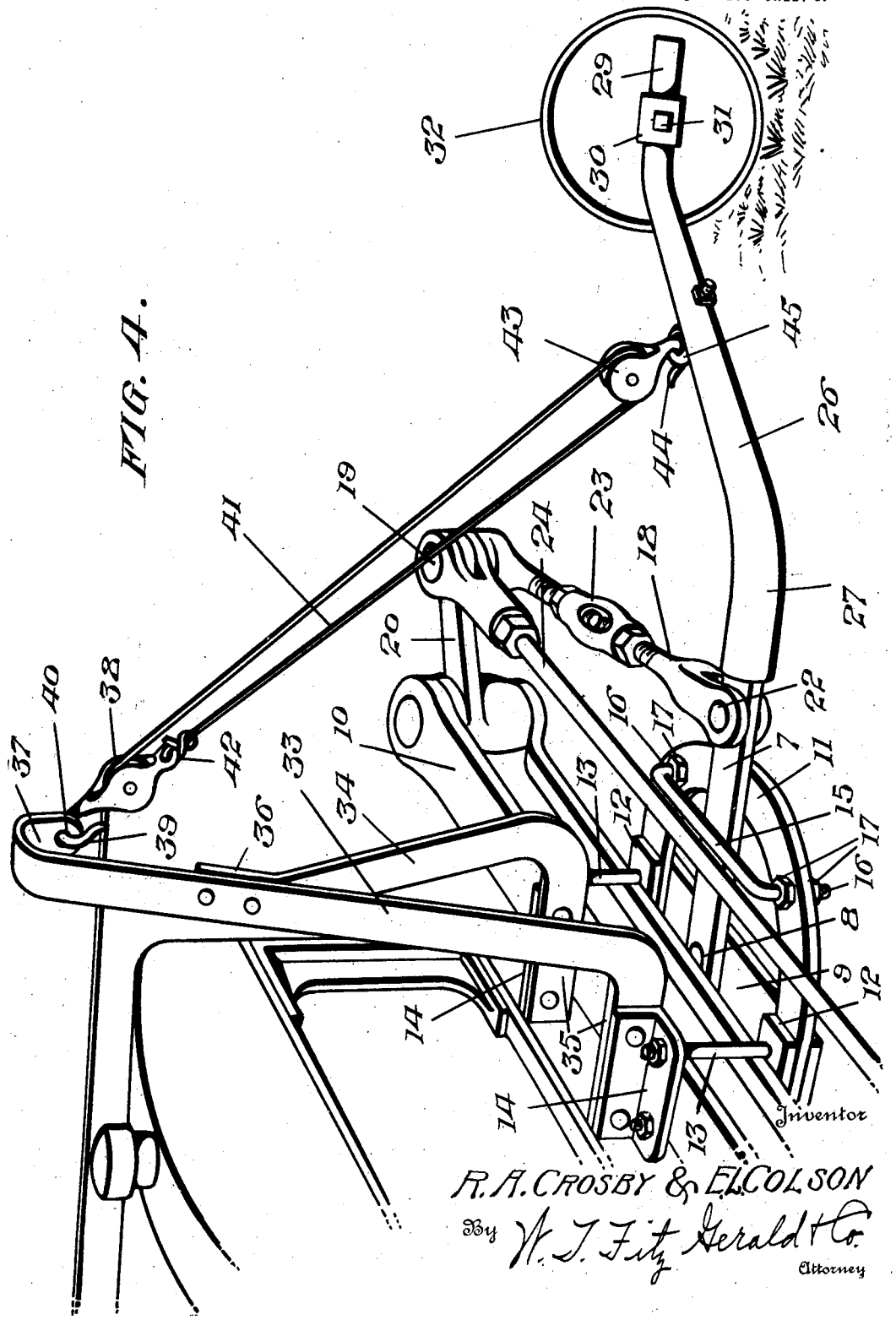

RAYMOND A. CROSBY AND EDD L. COLSON, OF WAUNETA, NEBRASKA.

COMBINATION STEERING DEVICE AND GAUGE.

1,405,901.   Specification of Letters Patent.   Patented Feb. 7, 1922.

Application filed October 6, 1920. Serial No. 415,152.

*To all whom it may concern:*

Be it known that we, RAYMOND A. CROSBY and EDD L. COLSON, citizens of the United States, residing at Wauneta, in the county of Chase and State of Nebraska, have invented certain new and useful Improvements in a Combination Steering Device and Gauge; and we do hereby declare the following to be a full, clear, and exact description of the invention, such as will enable others skilled in the art to which it appertains to make and use the same.

The present invention relates to an automatic steering device and gauge for tractors used for listing corn, plowing, and the like, and the primary object of the invention is the provision of a novel and improved attachment for a tractor and including a pilot member operatively connected to the steering gear, whereby to automatically steer the tractor and guide the same parallel with the last or nearest furrow, whereby to serve as a gauge.

Another object is the provision of such a device which is reversible for right and left use, and means being provided whereby the pilot member can be readily reversed from one side to the other to operate with equal facility at either side.

A further object is the provision of novel means for mounting and connecting the pilot member with the tractor and for operatively connecting it with the steering gear, whereby the device is efficient and practical in operation and use.

A still further object is the provision, in combination with the automatic steering means or pilot member, of a novel yieldable connection between the hand control of the steering gear and the wheels, whereby the tractor can be steered either automatically or manually without interference.

With the foregoing and other objects in view, which will be apparent as the description proceeds, the invention resides in the construction and arrangement of parts hereinafter described, it being understood that changes can be made within the scope of what is claimed without departing from the spirit of the invention.

The invention is illustrated in the accompanying drawings, wherein:—

Figure 1 is a bottom plan view showing the improvements as applied to a tractor.

Fig. 2 is a front view thereof.

Fig. 3 is a perspective view of the yieldable connection.

Fig. 4 is a perspective view of the steering device.

The steering device comprises a forwardly-projecting lever 7 pivoted, as at 8, at its rear end on a transverse plate 9 which is secured below the front axle 10 of the tractor, and said lever extends across and bears slidably on a guide segment 11, having its end portions overlapping the plate 9, and spacers 12 are disposed between the segment 11 and axle 10. Clamping bolts 13 extend through the plate 9, segment 11 and spacers 12 and also engage through angle members 14 bearing on and extending across the axle, whereby to clamp said parts to the axle. A transverse guide rod 15 extends across the lever 7 and holds it down on the segment 11, and the end portions 16 of the rod 15 extend downwardly at an angle through the segment, and are secured thereto by means of nuts 17 on said end portions. The lever 7 is thus guided for oscillatory movement from side to side, and is operatively connected with the steering gear as will presently appear.

The operative connection between the lever 7 and said steering gear includes a link 18 having one end engaging the pivot 19 carried by one steering knuckle 20 pivoted to one end of the axle 10, and a steering knuckle 25 is pivoted to the opposite end of the axle, on which knuckles the wheels 21 are rotatable, and said knuckles are connected by the rod or link 24 whereby both wheels 21 are angled simultaneously, as usual. The pivot 19 is the one that connects the rod 24 with the knuckle 20, and by using a longer one, can also be used for connecting the link 18 with said knuckle. The opposite end of the link 18 is pivoted to the lever 7, as at 22, whereby the lever 7 in swinging, will swing the knuckle 20 correspondingly, for steering the tractor. The link 18 comprises two sections connected by a turn buckle 23, whereby said link can be adjusted in length, to properly position the lever 7 and knuckle 20 relatively to one another.

A pilot member is attached to the arm or lever 7, for automatically controlling the steering gear, and comprises a pole 26 extending obliquely forward from the lever, and the rear end of said pole is bent at an angle and projects rearwardly, as at 27, and is tubular and fitted for rotation on the forward terminal 28 of the lever 7, permitting the forward terminal 29 of the pole to move upwardly and downwardly, and also enabling said pole to be swung from one side to the other for changing from right hand to left hand control, and vice-versa. The forward terminal 29 of the pole 26 is also bent at an angle and projects longitudinally forward, and a collar or clamp 30 is fitted adjustably on the terminal 29 and is secured in its adjusted position by means of a set screw 31, or the like, and a dished or convexed disk 32 is carried for rotation by the collar 30 and is adapted to bear at its convex outer side against the turned side of the last or nearest furrow.

Means is provided for raising or hoisting the pole 26, to lift the pilot member from the ground, and, for this purpose, a pair of upwardly converging bars 33 and 34 are employed, the lower end portions 35 thereof being bent rearwardly and overlapping and being secured to the angle members 14, to be supported in front of the radiator. The bars 33 and 34 where they meet are secured together, as at 36, and the bar 33 extends upwardly beyond the bar 34 and has its upper end portion bent back downwardly for supporting a sheave 38, which has a hook 39 engaging through an aperture 40 in the portion 37. A cable or rope 41 has one end anchored to the sheave 38, as at 42, and passes through a second sheave 43 connected to the pole 26 and the cable 41 then passes back through the sheave 38 and thence rearwardly to a point where the operator can pull said cable and thereby raise the pole 26 from either side, to lift the disk 32 off of the ground. The sheave 43 has a hook 44 engaging an eye 45 secured to the pole 26 between the ends thereof.

In order that the wheels 21 can be angled for purpose of steering the tractor automatically, without the interference of the manual control, a yieldable connection between said manual control and steering knuckles is provided. Ordinarily, the manually-controlled steering rod 46 is pivoted to the knuckles 25, but, in carrying out the present invention, a yieldable connection between the rod 46 and knuckle 25 is used, including a pair of transverse bars 47 pivoted at one end, as at 48, to the knuckles 25, and at the other end, as at 49, within the fork 50 on the forward end of the rod 46, thereby providing for relative forward and rearward motion of said rod 46 and knuckle 25 relatively to one another. A longitudinal rod 51 parallel with the rod 46, has its forward end 52 pivoted to and located between the bars 47, between the pivots 48 and 49, and said rod 51 is slidable through the projecting and twisted end 53 of a U-shaped clamp 54 embracing the rod 46 and clamped to said rod 46 by means of bolts 55 or the like. Coiled expansion springs 56 and 57 are disposed on the rod 51 in front and in rear, respectively, of the portion 53, and the front spring 57 is confined between the portion 53 and a washer or collar 58 on the rod 51 near the forward end thereof, and retained in place by means of a cotter pin 59 or the like. The rear spring 57 is confined between the portion 53 and a washer 60 on the rod 51 near the rear end thereof and said washer 60 is retained in place by means of a nut 61 threaded on the rear terminal of said rod 51. The clamp 54 can be adjusted on the rod 46, to bring the spring 56 to the desired tension, and the nut 61 can then be adjusted on the rod 50, to bring the spring 57 under corresponding tension, whereby said springs balance one another and tend to maintain the parts in neutral or intermediate position.

In operation, when the tractor is being propelled with the pilot disk 32 running in the last or nearest furrow, the tractor will be automatically steered, as when listing corn or plowing, and the tractor will therefore move parallel with such furrow at a safe distance therefrom, whereby to serve as a gauge, and relieve the operator of the duty of steering the machine. The disk 32 in following the furrow, will position the lever 7 and steering gear accordingly, to guide the tractor, and when turning around or traveling on the road, the pilot member can be raised, by pulling the cable 41, so as not to interfere with the movement of the tractor, and such hoisting means also facilitates the raising of the pole 26 for swinging it from one side to the other. When the steering gear is controlled by the pilot member, the knuckles 25 can move without necessity of the rod 46 moving, inasmuch as the bars 47 can swing with the knuckles 25 thereby reciprocating the rod 51, and when said rod is moved forwardly, the spring 57 is compressed, whereas when the rod is moved rearwardly, the spring 56 is compressed. This enables the connection between the rod 46 and knuckles 25 to yield, and said springs tend to maintain the steering gear in normal or intermediate position for guiding the tractor straight ahead. Furthermore, when the pilot member is raised off of the ground, the tractor can be steered manually, by moving the rod 46 forwardly and rearwardly to swing the knuckles 25, it being noted that said rod 46 being connected to the bars 47, and the springs 56 and 57 being disposed between the portions of the rods 46 and 51, will result in the knuckles 25 moving forwardly and rearwardly with the rod 46, with but a slight yielding movement that will not interfere with manual steering. Thus, when the rod 46 is moved forwardly, it moves the bars or links 47 forwardly, and the spring 56 is also compressed to move said bars forwardly, and when the rod 46 is moved rearwardly, the bars 47 are moved rearwardly by the rod 46 and spring 57. Thus, by the provision of the springs between the rod or actuating member 46 and the links or bars 47 loosely connecting said rod 46 and knuckle 25, the tractor can be steered automatically without interference, and can also be steered manually without difficulty or objection.

Having thus described the invention, what is claimed as new is:—

1. A steering device including means attachable to the front axle of a tractor, a forwardly-projecting lever carried by said means, a pilot member connected to the lever, means for connecting said lever to the steering gear of the tractor, upwardly converging bars carried by said first named means and attached together, said pilot member being mounted on the lever for turning movement to raise and lower it, and means connected to one of said bars and pilot member for raising said pilot member.

2. A steering device for a tractor comprising a plate, a segment, a lever pivoted to the plate and extending forwardly across the segment, a guide rod carried by the segment for holding the lever against same, means for attaching said plate and segment to the front axle of the tractor, a pilot member extending from said lever, and means for connecting said lever with the steering gear of the tractor.

3. A steering device comprising means attachable to the front axle of a tractor, a lever carried by said means, a pilot member connected to the lever, means for connecting said lever to the steering gear of the tractor, upwardly converging bars carried by said first named means and attached together, sheaves carried by one of said bars at its upper end and by said pilot member, the pilot member being mounted on the lever for turning movement to raise and lower it, and a cable extending through said sheaves for raising said pilot member.

4. A steering device comprising the combination with the steering gear of a tractor, including a movable member and a manual control member, of pilot means operatively connected to the steering gear, a member pivoted to the aforesaid members for swinging movement relatively to said members, and spring means between the third-named member and one of the other members tending to maintain the third named member in intermediate position relatively to the other members and permitting yielding action between the first and second named members.

5. A steering device comprising the combination with the steering gear of a tractor, including a steering knuckle, and a manual control rod, of a pilot member operatively connected to the steering gear, a bar pivoted to said knuckle and rod to permit relative motion thereof and to be swung relatively to said knuckle and rod, and spring means between said bar and rod tending to maintain said bar in intermediate position relatively to said knuckle and rod and permitting them to yield in opposite directions.

6. A steering device comprising the combination with the steering gear of a tractor, including a steering knuckle, and a manual control rod, of a pilot member operatively connected to the steering gear, a bar pivoted to said knuckle and rod to permit relative motion thereof, a rod pivotally connected to said bar between the control rod and knuckle, a member carried by the control rod through which the second named rod is slidable, and springs on the second named rod bearing against the opposite sides of said member and tending to maintain the control rod and knuckle in intermediate position relatively to one another, and permitting them to yield in either direction.

In testimony whereof we have signed our names to this specification in the presence of two subscribing witnesses.

RAYMOND A. CROSBY.
EDD L. COLSON.

Witnesses:
E. E. MUSIL,
F. J. HAJEK.